Jan. 7, 1964    M. R. MORROW ETAL    3,117,068
METHOD OF CONDUCTING EXOTHERMIC GAS PHASE CHEMICAL REACTIONS
Filed Dec. 22, 1959
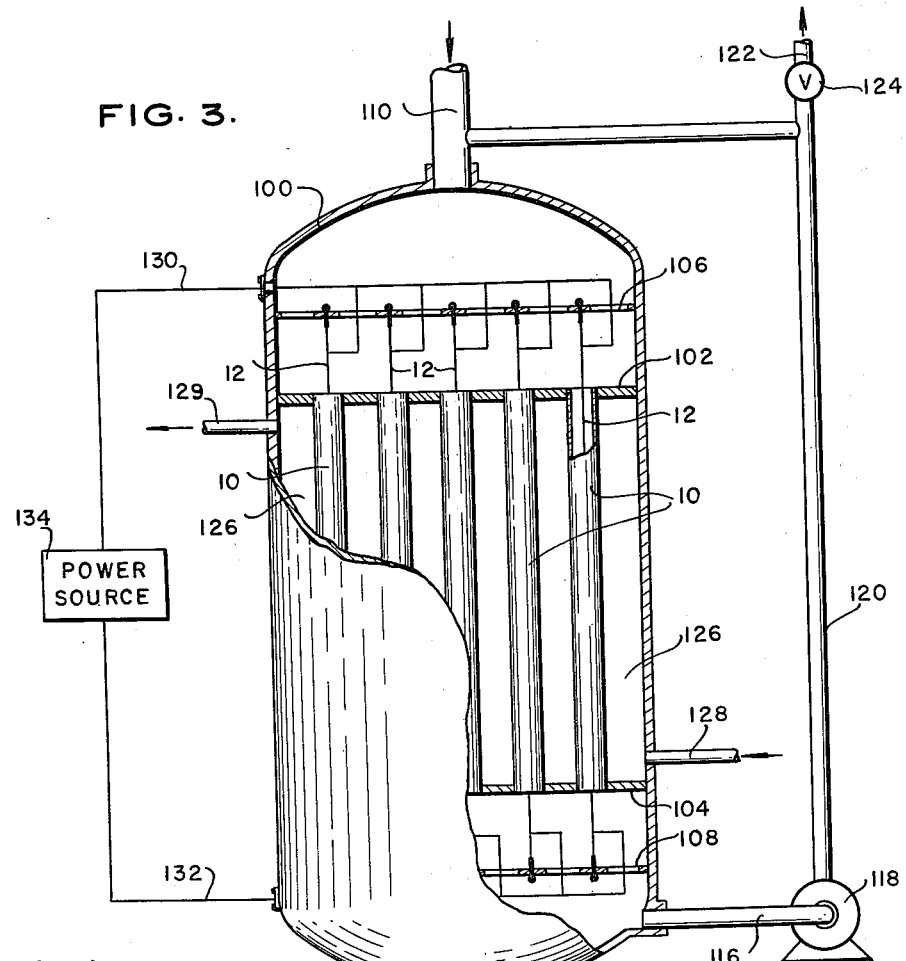
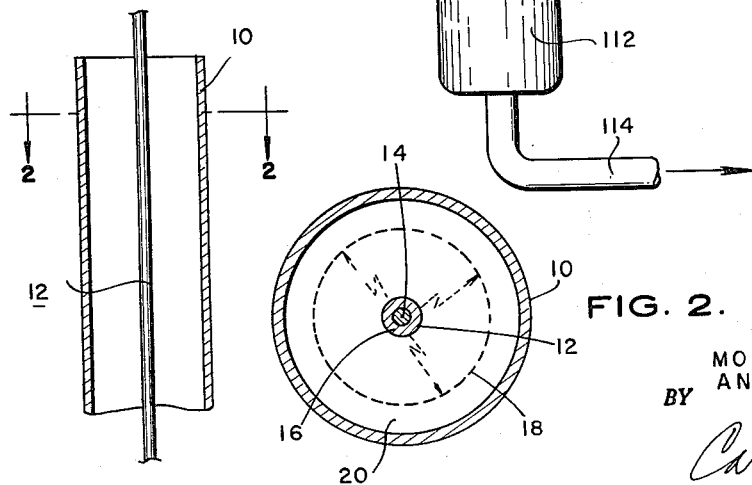
INVENTORS.
MORRIS R. MORROW,
ANDREW D. SUTTLE JR.,
BY
ATTORNEY.

United States Patent Office 3,117,068
Patented Jan. 7, 1964

3,117,068
METHOD OF CONDUCTING EXOTHERMIC GAS PHASE CHEMICAL REACTIONS
Morris R. Morrow and Andrew D. Suttle, Jr., Baytown, Tex., assignors, by mesne assignments, to Esso Research and Engineering Company, Elizabeth, N.J., a corporation of Delaware
Filed Dec. 22, 1959, Ser. No. 861,246
6 Claims. (Cl. 204—154)

This invention relates to a method for conducting gas phase exothermic chemical reactions. More particularly, this invention relates to an improved method for promoting gas phase exothermic chemical reactions.

Briefly, in accordance with the present invention, a compound having a molecular weight of not more than about 400 is passed in vapor phase through a reaction zone containing a plurality of reaction tubes containing coaxial centrally located sources of high energy alpha radiation to initiate the exothermic reaction. The tubes preferably have a radius which is within the range of about 1.2 to about 1.5 times the range of the most energetic alpha emission of the system. In addition, the tubes are preferably cooled (e.g., to a temperature sufficient to liquify the reaction products) whereby products of the exothermic reaction may be condensed upon the surface of the tubes to thereby inhibit further irradiation of the desired reaction products.

The source of alpha emission in the reaction tube is suitably a wire which is centrally located in the tube and which is preferably composed of a ductile substrate such as nickel, palladium, rhodium, copper, ruthenium, etc. having deposited on the surface thereof a thin layer of solid high specific activity metallic radioactive material having a short-lived alpha active isotope or isotopic chain. For the purpose of this application, a short-lived alpha decay chain may be defined as a single alpha emission (single stage) or a series of two or more (6 to 10) alpha particles emitted with or without, but usually with, interspersed beta emission (plural stage). Thus, the alpha decay chain may have 1 to 10 stages. The intensity of alpha emission should preferably be from about $10^6$ to about $10^{10}$ alpha particles per square centimeter of film surface per second. The half-life should be less than 100 years and is preferably about 1½ to 10 times the life of the reactor.

Representative examples of suitable radioactive metallic alpha emitters which may be utilized in accordance with the present invention include uranium$^{232}$, thorium$^{238}$, radium$^{237}$, radium$^{226}$, lead$^{210}$, polonium$^{210}$, etc. By way of specific example of the foregoing, the following decay chains are cited:

TABLE I

Po$^{210}$ produced from Bi$^{209}$ by the reaction Bi$^{209}$ (n,γ) Bi$^{210}$→Po$^{210}$
Pb$^{210}$ recovered from the decay of U$^{238}$ and/or Ra$^{226}$
Ac$^{227}$ produced from Ra$^{226}$ by the reaction Ra$^{226}$ (n,γ) Ra$^{227}$→Ac$^{227}$
U$^{232}$ produced from Pa$^{231}$ by the reaction Pa$^{231}$ (n,γ) Pa$^{232}$→U$^{232}$

| Isotope | Max. Half-Life | E, mev. | E Avail., mev. |
|---|---|---|---|
| Po$^{210}$ | 138 days | 5.3 | 5.3 |
| Pb$^{210}$ | 25 years | 5.3 | 5.7 |
| Ra$^{227}$, Ac$^{227}$ | 27.7 years | 33.2 | [1] 37.7 |
| Pa$^{232}$, U$^{232}$ | 70 years | 38.0 | [1] 39.9 |

[1] Includes a portion of the β- and γ-decay energy.

Some of the source material such as thorium$^{228}$ and radium$^{236}$ may be separated from the natural decay chains in the recovery of thorium or uranium for other purposes. Other isotopes can be prepared by the neutron irradiation of naturally occurring isotopes. Thus, uranium$^{232}$ and radium$^{227}$ may be prepared in this fashion from thorium$^{232}$ and radium$^{226}$, respectively.

As indicated above, it is a feature of the present invention that the wire is positioned in a tube having a radius which is within the range from about 1.2 to about 1.5 times the range of the most energetic alpha particle. As an indication of the range associated with various alpha energies, the following table is presented:

TABLE II

Travel Distances, R, in Various Media

| Particle energy E (mev.): | r (cm. air) |
|---|---|
| 0.5 | 0.385 |
| 1.0 | 0.616 |
| 2.0 | 1.23 |
| 3.0 | 1.62 |
| 4.0 | 2.92 |
| 5.0 | 4.08 |
| 7.0 | 6.85 |
| 10.0 | 7.70 |

In general, useful alpha particles will have energies within the range from about 3 to 10 mev.

The ionization density of alpha particles is much greater than that of beta or gamma radiations and therefore the energy of alpha particles is dissipated over much smaller paths. The range of all alpha particles is less than 1 cm. of aluminum and therefore there is less need for shielding the reaction zone of the present invention to provide protection from bioradiological effects due to alpha emission. When the alpha decay chain includes other emissions such as beta radiation or gamma radiation, shielding may be necessary to minimize bioradiological effects attributable to effects of this nature. In this connection, it is to be observed that the low energy electromagnetic radiation which is associated with alpha decay will also be efficiently absorbed and therefore it does not present a bioradiological problem.

In the interest of economy and efficiency, it is generally preferable to utilize a reaction zone containing a plurality of tubes constructed in the above-described manner, the tubes being supported by common headers within a confined zone having a means for introducing reactants, means for withdrawing reaction products, and means for maintaining a desired temperature within the reaction zone.

The process of the present invention is particularly applicable with respect to exothermic gas phase oxidation reactions wherein liquid products are formed. Thus, the controlled oxidation, nitration, halogenation, sulfohalogenation, sulfination, etc. of organic compounds may be promoted in accordance with the present invention. By way of specific example, the oxidation of hydrogen chloride to chlorine with oxygen may be efficiently conducted in accordance with the present invention. The nitration of an aromatic hydrocarbon such as toluene with a nitrating agent such as nitrogen dioxide may be promoted. As an example of a halogenation reaction, an aromatic or aliphatic hydrocarbon such as hexane, heptane, cyclohexane, benzene, etc. may be halogenated with halogenating agents such as chlorine, bromine, etc. Sulfohalogenation of hydrocarbons (e.g., the sulfochlorination of n-heptane or a similar hydrocarbon) may be promoted as well as the sulfonation of an aliphatic or aromatic hydrocarbon with sulfur dioxide and chlorine. It will be understood that the foregoing are but representative of the generic class of exothermic gas phase reactions which may be conducted in accordance with the present invention.

Reactions which are excluded include endothermic reactions such as the addition of carbon dioxide or carbon monoxide to hydrocarbons because, in this instance, dimerization of the hydrocarbon radicals is preferred to addition of the oxide. Similarly, the fixation of nitrogen when air is irradiated will be effected with poor efficiency.

Reactions of the above-described nature have been reasonably characterized by those skilled in the art and the optimum thermodynamic conditions for reaction have been ascertained or are readily ascertainable. As a consequence, the present specification will not be burdened with a detailed description of specific reaction conditions to be employed, such reaction conditions being known or ascertainable to those of reasonable skill in the art. Thus, the reactions of the present invention may be conducted at subatmospheric or superatmospheric pressures. Preferably, a superatmospheric pressure of 0.1 to 100 and, more specifically, 1 to 10 atmospheres are employed. The temperature to be maintained in the reaction zone will be dependent upon pressure and other reaction variables but will, in general, be within the range of about 100° to 1000° C.

It is a feature of the present invention that the addition and substitution reactions which are of an exothermic nature result in the formation of products having a higher molecular weight than the feed components. Thus, the walls of the reaction tubes may be maintained at a predetermined temperature such that the addition or substitution product will condense (i.e., liquefy) on the wall of the tube. This is advantageous in that the reaction products are no longer subject to irradiation. This not only permits an efficient utilization of the energy source but also prevents degradation of the products of reaction. Further, the separation of liquid reaction products from gaseous by-products is greatly facilitated.

While it is advantageous to induce the collection of liquid products on the wall of the tube, it is not desirable to permit the condensation of liquid products on the wire within the tube in that such accumulations will tend to form radiation impervious coatings on degradation of the condensed liquid. However, the high specific activity source of alpha radiation will generally maintain the wire at a temperature above the condensation point of the liquid products. In those situations wherein still further heating of the wire is required, an electrically conductive substrate such as copper, Nichrome, etc. may be employed and an electrical current may be passed through the substrate in order to further elevate the temperature of the wire.

The invention will be further illustrated in connection with the accompanying drawings wherein:

FIG. 1 is an elevational view, partly in section, illustrating the manner in which a reaction tube is conducted in accordance with the present invention;

FIG. 2 is a plan view, in section, taken along the lines 2—2 of FIG. 1; and

FIG. 3 is a schematic side elevational view, in section, illustrating a preferred mode of the present invention.

Turning now to FIG. 1, there is provided a tube 10 provided of any suitable structural material such as brass, nickel, stainless steel, etc. The tube 10 will have a radius which is from about 1.2 to about 1.5 times the range of the most energetic alpha of the system. Commonly, therefore, the inner diameter of the tube 10 will be within the range of about 0.1 to about 20 cm., depending upon the reaction pressure employed. Positioned within the tube 10 is a wire 12 having a coating of a radioactive alpha emitting material as defined above.

Thus, with reference to FIG. 2, the tube 10 is shown in section surrounding the wire containing an alpha emitter. The wire contains a substrate (e.g., core) 14 of a ductile material, as set forth above, upon which is deposited a layer 16 of alpha emitting material. The diameter of the wire will preferably be as small as possible consistent with the required mechanical strength in order to minimize absorption of energy from the source film.

Thus, the diameter of the wire may preferably be within the range of about 0.01 to about 10 mm. The thickness of the film of radioactive material, as indicated, should preferably be such that the specific activity of the radioactive material is within the range of about $10^6$ to $10^{10}$ alpha particles per cm. of film surface per second.

In accordance with this construction, substantially completely all of the alpha radiation will be contained within the tube 10 so that the alpha particles will not directly impinge upon the surface of the tube 10. Thus, the maximum range of alpha particles is schematically illustrated by the dotted line 18 in FIG. 2. The zone 20 intermediate the dotted line 18 and the inner surface of the tube 10 is a collection zone for the condensation and collection of liquid reaction products.

A preferred reactor design of the present invention and of a preferred mode of practicing the present invention may be considered with respect to FIG. 3.

Turning now to FIG. 3, there may be provided a tubular shell 100 of a pressure resistant structure material such as steel and alloys thereof provided with spaced headers 102 and 104 for a plurality of reaction tubes 10.

There may also be provided as a means of supporting a plurality of wires 12 auxiliary headers 106 and 108. It will be understood that the auxiliary headers 106 and 108 should be perforated in order to permit the passage of reactants therethrough. As schematically shown in FIG. 3, each of the wires 12 for each of the corresponding tubes 10 is secured at its ends to the headers 106 and 108.

An inlet line 110 may be provided (e.g., at the top) of the shell 100 for the introduction of reactants.

At the bottom of the shell 100 there may be provided a boot zone 112 for the collection of liquid products, the zone 112 being provided with a liquid withdrawal line 114.

There may also be provided an off-gas drawline 116 interconnected with a suitable source of suction such as a pump 118. The discharge line 120 from the pump 118 is preferably utilized for recycling at least a portion of the off-gas. All or any desired portion of the off-gas may be discharged from the system by way of a vent line 122 controlled by a valve 124 leading from the recycle line 120.

The space 126 intermediate the headers 102 and 104 may be defined as a heat exchange zone. Suitable coolant such as water, a liquefied normally gaseous hydrocarbon, a liquefied volatilizable material, etc. is introduced into the heat exchange zone 126 by way of a charge line 128 for flow through the zone 126 in a generally countercurrent manner with respect to the flow of reactants through the zone 10. Spent heat exchange fluid may be withdrawn from the zone 126 by way of a discharge line 129.

In situations wherein it is desirable to positively heat the wires 12, an electrical circuit composed of electrical leads 130 and 132 interconnecting each of the wires 12 with a suitable power source 134 may be provided.

The invention will be further illustrated by the following specific examples which are given by way of illustration and not intended as limitations on the scope of this invention.

EXAMPLE I

*Sulfochlorination of n-Heptane*

In order to effectuate the sulfochlorination of n-heptane, a reactor of the type shown in FIG. 3 may be provided, each of the reactor tubes in this instance having a diameter of about 3 cm. A platinum wire has deposited thereon a suitable alpha source such as a carbide of uranium$^{232}$ or metallic polonium$^{210}$ in an amount sufficient to provide a film having a thickness of about 10 to 100 micrograms per square cm. to thereby provide an alpha activity of about .01 to about .001 curie per square cm.

The reaction conditions employed will suitably include a pressure of about 1 to 5 atmospheres and a temperature of about 125° to about 130° C. Heptane and sulfonyl chloride are charged to the reaction zone in the ratio of about 3 to 5 mols of heptane per mol of sulfonyl chloride. The walls of the tube may be cooled with any suitable heat exchange medium such as water. Each of the tubes may suitably have a length of about 1 meter. As a consequence, active entities formed by irradiation of sulfonyl chloride and the heptane with alpha particles will combine to provide heptyl sulfonyl chloride and heptyl chloride, the selectivity to the sulfonyl chloride being about 80 percent. The heptyl chloride and heptyl sulfonyl chloride will be condensed on the surfaces of the reaction tubes and may accordingly be collected in the boot section 112 for discharge by way of the line 114 for separation and recovery.

Off-gas, consisting principally of hydrogen chloride and the unreacted feed components may be discharged by way of the line 116, stripped of hydrogen chloride in a suitable stripping zone (not shown) and recycled to the zone 110. As a consequence, substantially all of the feed components may be converted to heptyl chloride or heptyl sulfonyl chloride. The formation of a wide variety of radiation by-products is substantially inhibited.

EXAMPLE II

*Oxidation by Hydrogen Chloride*

In order to oxidize hydrogen chloride to chlorine with oxygen, a plurality of tubes having an internal diameter of about 1 cm. and a length of about 1 meter are provided, there being positioned in each of the tubes a wire of a tantalum-uranium alloy having a diameter of about 0.1 mm. located therein. The uranium employed may suitably be uranium$^{232}$ and the uranium may be employed in an amount sufficient to provide an alpha activity .01 to 0.1 curie per square cm. The reaction conditions to be employed for this particular reaction may include a pressure within the range of about 10 to 100 atmospheres and a temperature between about 200° and 350° C.

Under the above-described conditions, hydrogen chloride and oxygen in the molar ratio of about 3 to 1 are passed through the reactor tubes under the aforesaid reaction conditions. As a consequence, an oxidation reaction is promoted resulting in the conversion of hydrogen chloride and oxygen to chlorine and water.

What is claimed is:

1. A method for conducting an exothermic reaction which comprises passing exothermically reactive gaseous feed components through an exteriorly cooled reaction tube having coaxially positioned therein a high surface area solid high specific activity metallic radioactive material having a short-lived alpha decay chain, said radioactive material having an intensity of about $10^6$ to $10^{10}$ alpha particles per square centimeter of surface area per second, said tube having a radius from about 1.2 to 1.5 times the range of the most energetic alpha emission, whereby said reactants are reacted in the central portion of said tube and whereby the reaction products are condensed on the inner surface of said tube and recovering said collected reaction product.

2. A method as in claim 1 wherein the radioactive material is a carbide of a compound selected from the class consisting of U$^{235}$ and Po$^{210}$ deposited on a platinum wire, wherein the deposit is sufficient to provide an alpha activity of 0.01 to 0.001 curie per square centimeter, wherein the reactants are heptane and sulfonyl chloride and wherein the reaction products comprise heptyl chloride and heptyl sulfonyl chloride.

3. A method as in claim 1 wherein the radioactive material is a wire composed of a U$^{232}$ tantalum alloy containing an amount of U$^{232}$ sufficient to provide an alpha activity of about 0.01 to about 0.1 curie per square centimeter, wherein the reactants are hydrogen chloride and oxygen and the reaction products comprise chlorine and water.

4. A reactor for exothermic gas phase chemical reactions comprising a shell, a plurality of aligned tubes mounted in said shell, a wire in each tube coaxially aligned therewith, said wire comprising a solid metallic radioactive material having a short-lived alpha decay chain, said radioactive material being present in an amount sufficient to provide an intensity of $10^6$ to $10^{10}$ alpha particles per square centimeter of surface of said wire, each of said tubes having a radius of about 1.2 to 1.5 times the range of the most energetic alpha emission, means for introducing gas phase reactants into said shell, means for directing the gas phase reactants through said tubes, means for withdrawing products from said shell and means for cooling the outer surface of each of said tubes to provide a zone inside each of said tubes for the formation of reaction products.

5. A reactor for exothermic gas phase chemical reactions comprising a shell, a plurality of aligned tubes mounted in said shell, cooling means for cooling the outer surface of each of said tubes to provide a zone inside each of said tubes for the formation of reaction products, an electrically conductive wire in each tube coaxially aligned therewith, said wire comprising a solid metallic radioactive material having a short lived alpha decay chain, said radioactive material being present in an amount sufficient to provide an intensity of $10^6$ to $10^{10}$ alpha particles per square centimeter of surface of said wire, each of said tubes having a radius of about 1.2 to 1.5 times the range of the most energetic alpha emission, means electrically coupled with said wires for flowing an electric current therethrough, means for introducing gas phase reactants inso said shell, means for directing the gas phase reactants through said tubes, and means for withdrawing products from said shell.

6. A reactor for exothermic gas phase chemical reactions comprising a shell, spaced headers mounted in said shell, a plurality of aligned tubes mounted intermediate said headers and sealed thereto at the ends thereof, a wire in each tube coaxially aligned therewith, said wire comprising a solid metallic radioactive material having a short-lived alpha decay chain, said radioactive material being present in an amount sufficient to provide an intensity of $10^6$ to $10^{10}$ alpha particles per square centimeter of surface of said wire, each of said tubes having a radius of about 1.2 to 1.5 times the range of the most energetic alpha emission, means for introducing gas phase reactants into said shell, means for withdrawing products from said shell and means for flowing a heat exchange fluid through the space intermediate said headers.

References Cited in the file of this patent

UNITED STATES PATENTS

| 1,718,899 | Fischer | June 25, 1929 |
| 2,992,980 | Suttle | July 18, 1961 |

FOREIGN PATENTS

| 697,601 | Great Britain | Sept. 23, 1953 |

OTHER REFERENCES

Allen: Chemical Effects of Ionizing Radiation on Simple Inorganic Compounds and Aqueous Solutions (1946), pages 2 and 9 (MDDC–363, A.E.C., Oak Ridge, Tenn.)